(12) United States Patent
Magre

(10) Patent No.: US 7,188,802 B2
(45) Date of Patent: Mar. 13, 2007

(54) CONVERTIBLE AIRCRAFT PROVIDED WITH TWO TILT FANS ON EITHER SIDE OF THE FUSELAGE, AND WITH A NON-TILTING FAN INSERTED IN THE FUSELAGE

(75) Inventor: Eric Magre, Pelissanne (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 11/016,902

(22) Filed: Dec. 21, 2004

(65) Prior Publication Data

US 2006/0022084 A1 Feb. 2, 2006

(30) Foreign Application Priority Data

Dec. 23, 2003 (FR) .................. 03 15237

(51) Int. Cl.
B64C 27/22 (2006.01)
(52) U.S. Cl. ..................................... 244/7 R
(58) Field of Classification Search ............... 244/12.4, 244/12.5, 12.6, 7 R, 17.21, 17.23, 17.25, 244/12.3, 23 B
See application file for complete search history.

(56) References Cited

U.S. PATENT DOCUMENTS

| | | | | |
|---|---|---|---|---|
| 1,766,844 A | * | 6/1930 | Springer | 244/12.3 |
| 1,783,458 A | * | 12/1930 | Windsor | 244/6 |
| 2,502,045 A | * | 3/1950 | Johnson | 244/12.3 |
| 2,941,749 A | * | 6/1960 | Sullivan et al. | 244/6 |
| 2,961,189 A | * | 11/1960 | Doak | 244/12.4 |
| 3,033,492 A | * | 5/1962 | Henry | 244/23 R |
| 3,038,683 A | * | 6/1962 | Henry | 244/12.4 |
| 3,065,929 A | * | 11/1962 | Holland, Jr. | 244/12.4 |
| 3,086,731 A | | 4/1963 | Beckington | |
| 3,089,666 A | | 5/1963 | Quenzler | |
| 3,106,369 A | * | 10/1963 | Borst | 244/7 R |
| 3,117,748 A | | 1/1964 | Edmonds | |
| 3,120,362 A | * | 2/1964 | Lloyd et al. | 244/52 |
| 3,122,343 A | * | 2/1964 | Liebach et al. | 244/23 B |
| 3,139,244 A | * | 6/1964 | Bright | 244/12.3 |
| 3,146,590 A | * | 9/1964 | Erwin | 60/39.17 |
| 3,155,342 A | * | 11/1964 | Ludwig et al. | 244/12.5 |

(Continued)

FOREIGN PATENT DOCUMENTS

FR 1 282 421 1/1962

(Continued)

OTHER PUBLICATIONS

"Turbine." Wikipedia, The Free Encyclopedia. May 26, 2006, 18:56 UTC. Wikimedia Foundation, Inc. May 29, 2006, <http://en.wikipedia.org/w/index.php?title=Turbine&oldid=55296855>.*

(Continued)

Primary Examiner—Teri Pham Luu
Assistant Examiner—Stephen A Holzen
(74) Attorney, Agent, or Firm—Young & Thompson

(57) ABSTRACT

The present invention relates to a convertible aircraft provided with first and second tilt fans disposed on either side of the fuselage a little forward of the center of gravity of the convertible aircraft. In addition, the convertible aircraft includes, in remarkable manner, a non-tilting fan that is permanently in a vertical position and that is contained inside the fuselage.

18 Claims, 2 Drawing Sheets

U.S. PATENT DOCUMENTS

| | | | | | |
|---|---|---|---|---|---|
| 3,212,731 | A | * | 10/1965 | Kappus | 244/12.5 |
| 3,278,138 | A | * | 10/1966 | Haberkorn | 244/12.3 |
| 3,282,534 | A | * | 11/1966 | Lascaris et al. | 244/6 |
| 3,284,027 | A | * | 11/1966 | Marc | 244/12.4 |
| 3,286,470 | A | * | 11/1966 | Gerlaugh | 60/229 |
| 3,289,980 | A | * | 12/1966 | Gardner | 244/56 |
| 3,290,885 | A | * | 12/1966 | Samuel | 60/226.1 |
| 3,335,977 | A | * | 8/1967 | Meditz | 244/12.4 |
| 3,347,496 | A | * | 10/1967 | Opfer jr. | 244/53 B |
| 3,347,793 | A | * | 10/1967 | Leathley | 244/12.3 |
| 3,388,878 | A | * | 6/1968 | Peterson et al. | 244/23 B |
| 3,469,803 | A | * | 9/1969 | Schmielau | 244/12.4 |
| 3,486,716 | A | * | 12/1969 | Haberkorn et al. | 244/12.5 |
| 3,499,620 | A | * | 3/1970 | Sturm et al. | 244/55 |
| 3,532,306 | A | * | 10/1970 | Meier | 244/53 R |
| 3,606,210 | A | * | 9/1971 | Busby | 244/12.4 |
| 3,618,875 | A | * | 11/1971 | Kappus | 244/12.3 |
| 3,739,580 | A | * | 6/1973 | Bland et al. | 60/204 |
| 3,972,490 | A | * | 8/1976 | Zimmermann et al. | 244/12.3 |
| 4,022,405 | A | * | 5/1977 | Peterson | 244/12.3 |
| 4,071,207 | A | * | 1/1978 | Piasecki et al. | 244/23 D |
| 4,116,405 | A | * | 9/1978 | Bacchi et al. | 244/12.4 |
| 4,296,896 | A | * | 10/1981 | Kress et al. | 244/12.4 |
| 4,456,203 | A | * | 6/1984 | Louthan | 244/23 D |
| 4,469,294 | A | * | 9/1984 | Clifton | 244/12.3 |
| 4,492,353 | A | * | 1/1985 | Phillips | 244/12.4 |
| 4,789,115 | A | * | 12/1988 | Koutsoupidis | 244/6 |
| 4,828,203 | A | * | 5/1989 | Clifton et al. | 244/12.3 |
| 4,880,071 | A | * | 11/1989 | Tracy | 180/117 |
| 4,898,343 | A | * | 2/1990 | Kamo | 244/12.4 |
| 5,054,716 | A | * | 10/1991 | Wilson | 244/56 |
| 5,115,996 | A | * | 5/1992 | Moller | 244/12.5 |
| 5,131,605 | A | * | 7/1992 | Kress | 244/56 |
| 5,161,741 | A | * | 11/1992 | Seyfang | 239/265.35 |
| 5,275,356 | A | * | 1/1994 | Bollinger et al. | 244/12.3 |
| 5,419,514 | A | * | 5/1995 | Ducan | 244/12.4 |
| 5,890,441 | A | | 4/1999 | James | |
| 6,254,032 | B1 | * | 7/2001 | Bucher | 244/12.2 |
| 6,260,793 | B1 | * | 7/2001 | Balayn et al. | 244/7 R |
| 6,467,726 | B1 | * | 10/2002 | Hosoda | 244/60 |
| 6,607,161 | B1 | * | 8/2003 | Krysinski et al. | 244/7 A |
| 6,629,670 | B1 | * | 10/2003 | Shah | 244/12.3 |
| 6,655,631 | B2 | * | 12/2003 | Austen-Brown | 244/12.4 |
| 6,708,920 | B2 | * | 3/2004 | Fukuyama | 244/12.4 |
| 6,843,447 | B2 | * | 1/2005 | Morgan | 244/12.3 |
| 6,886,776 | B2 | * | 5/2005 | Wagner et al. | 244/12.4 |
| 6,892,980 | B2 | * | 5/2005 | Kawai | 244/12.4 |
| 2002/0189230 | A1 | * | 12/2002 | Franchet et al. | 60/204 |
| 2003/0062442 | A1 | * | 4/2003 | Milde, Jr. | 244/12.3 |
| 2003/0080242 | A1 | * | 5/2003 | Kawai | 244/12.4 |
| 2003/0106959 | A1 | * | 6/2003 | Fukuyama | 244/23 R |
| 2004/0026563 | A1 | * | 2/2004 | Moller | 244/12.4 |
| 2005/0133662 | A1 | * | 6/2005 | Magre | 244/7 R |
| 2006/0016930 | A1 | * | 1/2006 | Pak | 244/12.4 |

FOREIGN PATENT DOCUMENTS

WO WO 03/066429 8/2003

OTHER PUBLICATIONS

"Turbofan." Wikipedia, The Free Encyclopedia. May 26, 2006, 14:12 UTC. Wikimedia Foundation, Inc. May 29, 2006, <http://en.wikipedia.org/w/index.php?title=Turbofan&oldid=55252976>.*

"Canard." Wikipedia, The Free Encyclopedia. May 26, 2006, 10:23 UTC. Wikimedia Foundation, Inc. May 29, 2006, <http://en.wikipedia.org/w/index.php?title=Canard&oldid=55720378>.*

"Foward-swept wing." Wikipedia, The Free Encyclopedia. Apr. 5, 2006, 16:10 UTC. Wikimedia Foundation, Inc. May 29, 2006, <http://en.wikipedia.org/w/index.php?title=Forward-swept_wing&oldid=47108237>.*

"Slotted Wings, Flaps and High Lift Devices", pp. 1-3 http://www.centennialofflight.gov/essay/Evolution_of_Technology/High_Lift_Devices/Tech6.htm.*

* cited by examiner

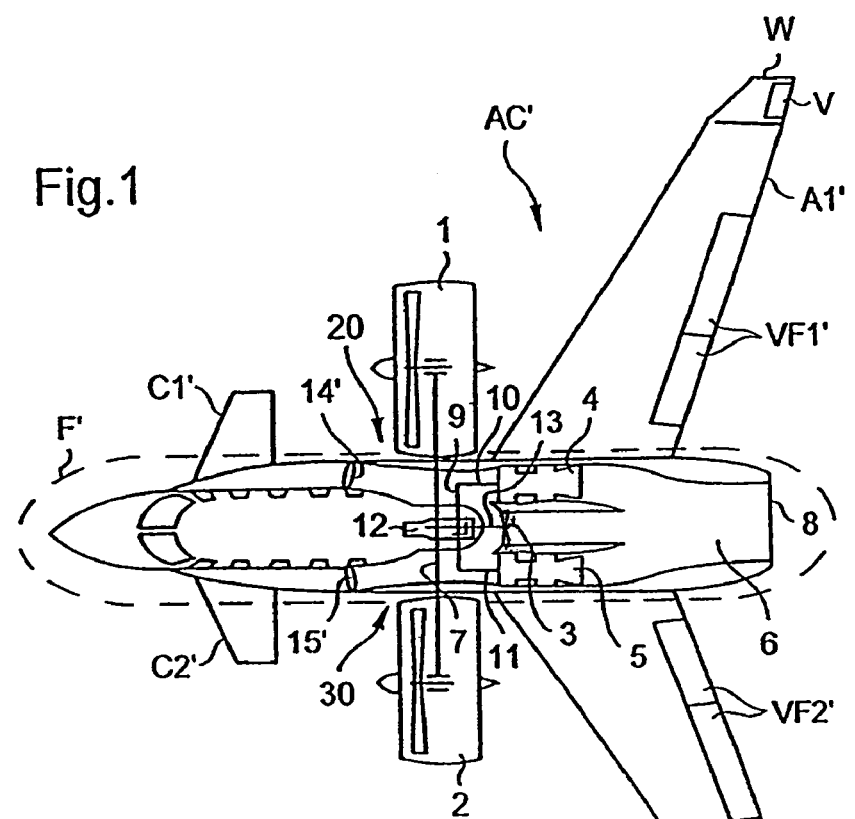
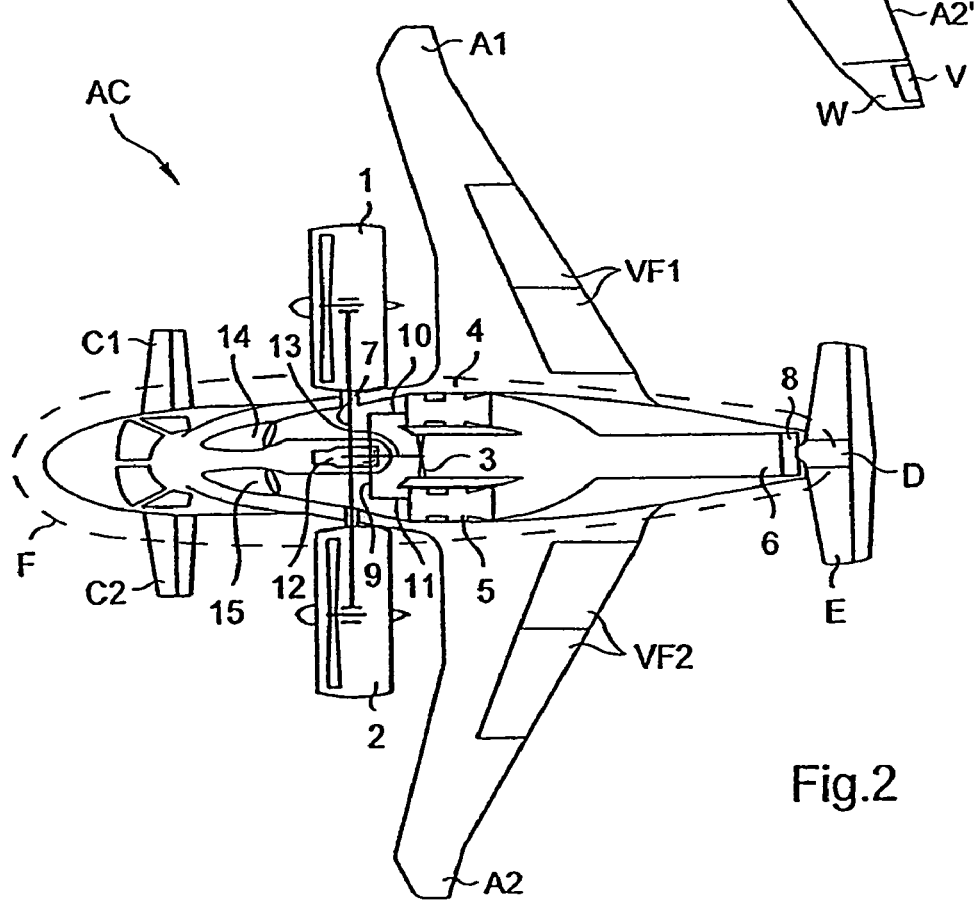

CONVERTIBLE AIRCRAFT PROVIDED WITH TWO TILT FANS ON EITHER SIDE OF THE FUSELAGE, AND WITH A NON-TILTING FAN INSERTED IN THE FUSELAGE

The present invention relates to a convertible aircraft provided with tilting ducted rotors, commonly referred to as "tilt fans", the aircraft being capable of taking off and landing over very short distances, or even vertically.

BACKGROUND OF THE INVENTION

Numerous configurations have been attempted in the history of aviation to enable aircraft to take off and land vertically.

The helicopter configuration enables stationary flight to be performed under satisfactory control, but that is to the detriment of cruising speed. Research has thus been undertaken to improve hovering control of airplanes. Nevertheless, the solutions that have been found so far have been of moderate efficiency and have required complex modifications either to propulsion systems or to engines.

Document U.S. Pat. No. 5,054,716 discloses a convertible aircraft where each of the rotors together with its control and engine means constitutes a tilting assembly referred to as a "tilt rotor". In that configuration, each engine must be capable of operating both in a substantially horizontal position and also in a vertical position, and that raises numerous problems associated either with the engine or with the cabling or the hydraulic and fuel ducts that need to pass through a tilting pivot. Furthermore, since the engines are generally turboengines, the gas jets from their nozzles have the drawback in helicopter mode of damaging the surface of take-off and landing areas.

Document U.S. Pat. No. 3,360,217 discloses a convertible aircraft having four tilt fans. In that configuration, the engines are disposed on the fuselage and remain in the same orientation regardless of the stage of flight. Passing from forward flight referred to as "airplane" mode to a helicopter mode is done by tilting the tilt fans only. Consequently, that makes it possible to avoid all problems associated with tilting an engine while it is running.

However, using four tilt fans is particularly penalizing insofar as the aircraft must have sufficient engine power to be capable of driving all four tilt fans. In addition, it goes without saying that the weight of the device is considerable, thereby correspondingly reducing the payload of the aircraft.

From those considerations, firstly it can be seen that the tilt rotor configuration is particularly difficult to implement and make suitable for industrial manufacture, because of the difficulties associated with tilting an engine. Secondly, it can be seen that the tilt fan configuration is easier to implement and does not present the above-described drawbacks, but that using four tilt fans increases the weight of the airplane in penalizing manner.

OBJECTS AND SUMMARY OF THE INVENTION

An object of the present invention is to provide a convertible aircraft enabling the above-mentioned limitations to be overcome.

According to the invention, a convertible aircraft provided with first and second tilt fans disposed on either side of the fuselage a little forward of the center of gravity of the aircraft, includes in remarkable manner a non-tilting fan, permanently in a vertical position and inserted in the fuselage.

In order to maintain equilibrium while hovering, three fans are quite sufficient to provide a support polygon. The weight saved by omitting a fourth fan enables the payload of the aircraft to be increased considerably.

In addition, the convertible aircraft advantageously includes two "canard" wings so as to be properly balanced.

In addition, two engines inserted in the fuselage drive the non-tilting fan as well as the first and second tilt fans, advantageously via a single main gearbox. The exhaust gases from the engines are mixed in a duct with cold air coming from the non-tilting fan, thereby creating a diluted flow of air. This diluted flow of air is expelled from the convertible aircraft via a two-directional jet deflector.

In a first embodiment, the convertible aircraft of the invention has two main wings that are sweptback, and that are disposed on either side of the fuselage in the high position. It is explained below that each of these main wings is advantageously provided with double-slotted high-lift flaps and also with a winglet including a single -flap. In this embodiment, the engines are inserted behind the cabin, and they are fed with air via two air inlets arranged on the sides of the fuselage.

In a second embodiment, the convertible aircraft has two main wings that are swept forward, and that are disposed on either side of the fuselage in the high position. Each of these wings is advantageously provided with double-slotted high-lift flaps. In addition, a tail fin and tail stabilizers enable the attitude of the aircraft to be controlled accurately. In addition, in this particular embodiment, the engines are arranged in the fuselage above the cabin, and they are fed with air via two distinct air inlets arranged in the top of the fuselage.

Finally, the non-tilting fan inserted in the fuselage draws in air coming from the air inlets of the engines. Under such conditions, there is no need to add an additional orifice in the fuselage in order to feed air to the non-tilting fan.

BRIEF DESCRIPTION OF THE DRAWINGS

The invention and its advantages appear in greater detail in the following description of embodiments given by way of illustration with reference to the accompanying figures, in which:

FIG. 1 is a diagrammatic plan view of a convertible aircraft in a first embodiment;

FIG. 2 is a diagrammatic view of a convertible aircraft in a second embodiment;

MORE DETAILED DESCRIPTION

Figure 3:
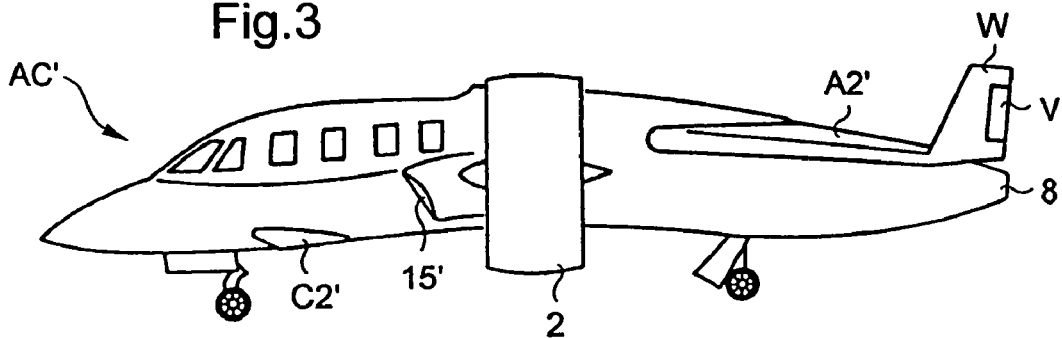
FIG. 3 is a side view of a convertible aircraft of the first embodiment having its tilt fans in the vertical position.

Elements that are present in more than one figure are given the same reference in all of them.

FIG. 1 shows a convertible aircraft AC' constituting a first embodiment. This convertible aircraft AC' has two engines 4, 5 inserted inside a fuselage F', the engines being provided with respective drive shafts 10, 11. Two air inlets 14' and 15' are arranged in respective sides 20 and 30 of the fuselage F' to feed air to the engines 4 and 5. The exhaust gases from the engines 4 and 5 are exhausted into a duct 6 of the fuselage F'.

FIG. 2 shows a convertible aircraft AC constituting a second embodiment. This convertible aircraft AC has two engines 4, 5 inserted inside a fuselage F, the engines being provided with respective drive shafts 10, 11. Two air inlets 14 and 15 formed in the top of the fuselage feed the engines 4 and 5 with air. The exhaust gases from these engines 4, 5 are exhausted into a duct 6 of the fuselage F.

In addition, having two engines for such convertible aircraft AC, AC' presents the advantage of providing a high degree of safety, insofar as failure of a single engine will not significantly affect operation of the aircraft AC, AC'.

With reference to FIGS. 1 and 2, the drive shafts 10, 11 serve to rotate a single interconnection shaft 9 via two distinct gear sets.

A main gearbox 12 arranged on the interconnection shaft 9 acts, via a secondary transmission shaft 13, to transfer the power from the two engines 4, 5 to a non-tilting fan 3 fixed in a vertical position and inserted inside the fuselage. In the same manner, this main gearbox 12 also drives the blades of first and second tilt fans 1 and 2 via a main transmission shaft 7. Thus, a single main gearbox 12 enables the blades of the non-tilting fan 3 and also of the first and second tilt fans 1 and 2 to be rotated, thereby considerably simplifying the architecture of the aircraft AC, AC'.

The non-tilting fan 3 takes in fresh air coming from the air inlet 14, 14', 15, 15' and exhausts it into the duct 6. Consequently, the exhaust gases coming from the two engines 4, 5 are diluted with fresh air in said duct 6. This dilution eliminates the infrared signature of the aircraft AC, AC' almost completely.

The diluted air flow resulting from the flow of air delivered by the non-tilting fan 3 together with the exhaust gases from the engines 4, 5 is ejected from the convertible aircraft AC, AC' via a two-directional jet deflector 8. When directed rearwards in airplane mode by the deflector 8, this diluted flow of air contributes to propelling the aircraft AC, AC'. In helicopter mode, the jet deflector 8 directs the flow downwards so as to provide balance and longitudinal control for the aircraft AC, AC'.

Furthermore, the first and second tilt fans 1 and 2 are disposed on either side of the fuselage F, F' a little forward of the center of gravity of the convertible aircraft AC, AC'. These two tilt fans 1, 2 are capable of tilting about the main transmission shaft 7.

The location of the first and second tilt fans 1, 2 on the fuselage F, F' corresponds substantially to the location where the main wing roots are positioned on a conventional airplane of non-convertible type.

Consequently, the tilt fan configuration requires the main wings A1, A2, A1', A2' to be positioned on the rear portion of the fuselage F, F'. The aircraft AC, AC' therefore cannot be properly controlled in pitch unless it possesses airfoil surfaces at the forward end of the fuselage, referred to as "canard" wings C1, C2, C1', C2'. The "canard" configuration is consequently a direct consequence of the tilt fan configuration.

In addition, the trailing edges of the main wings A1, A2, A1', A2' are provided with respective high-lift flaps VF1, VF2, VF1', VF2' having two slots, or the like.

Figure 4:
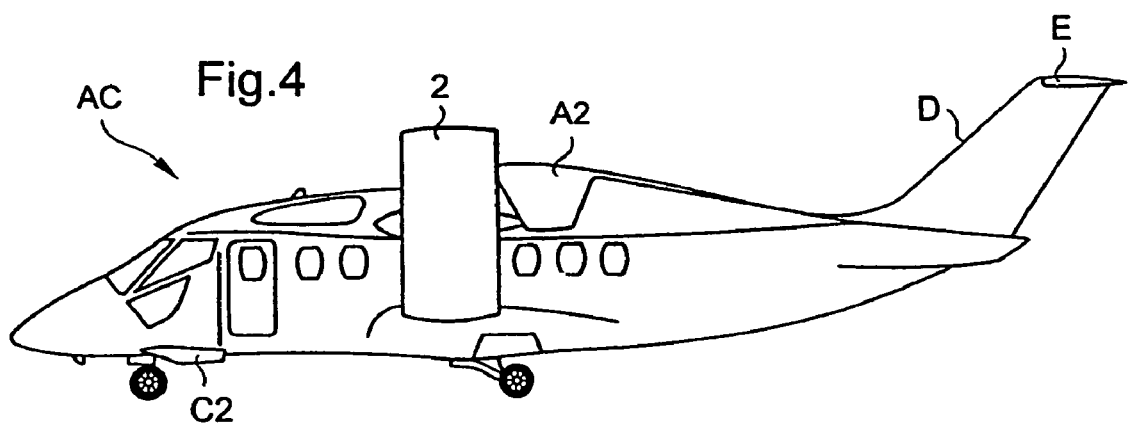
FIG. 4 is a side view of a convertible aircraft of the second embodiment having its tilt fans in the vertical position.

With reference to FIGS. 3 and 4, in airplane mode, the first and second tilt fans 1 and 2 are in the vertical position. They thus act like propellers, thereby propelling the aircraft AC, AC' in combination with the diluted air flow ejected rearwards by the jet deflector 8.

Figure 5:
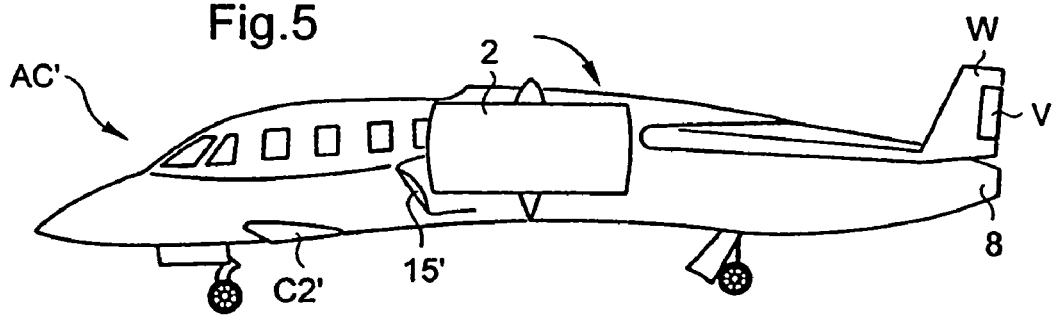
FIG. 5 is a side view of a convertible aircraft in the first embodiment having is tilt fans in the horizontal position.
Figure 6:
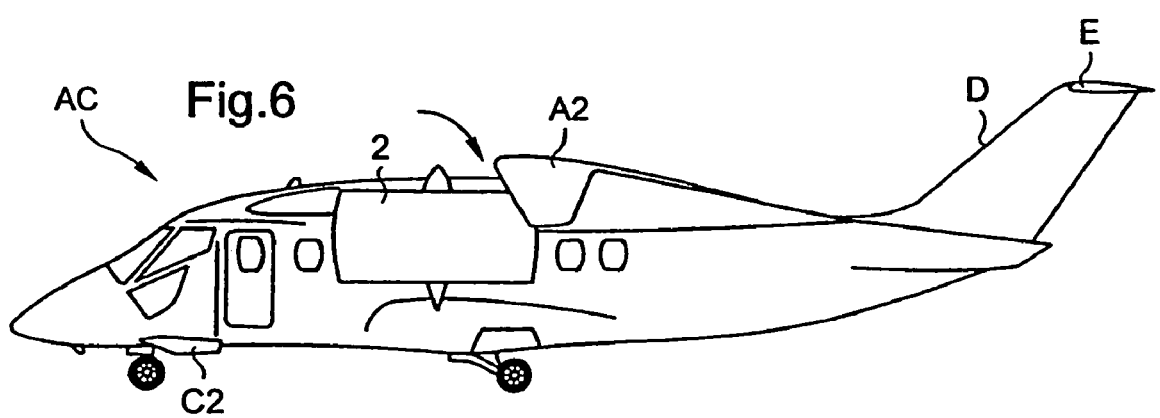
FIG. 6 is a side view of a convertible aircraft in the second embodiment having its tilt fans in the horizontal position.

With reference to FIGS. 5 and 6, in helicopter mode, the first and second tilt fans 1 and 2 are in a substantially horizontal position and thus serve to support the aircraft AC, AC' in combination with the diluted air flow ejected downwards by the jet deflector 8. In order to do this, as shown by a clockwise arrow in FIGS. 5 and 6, the first and second tilt fans 1 and 2 tilt about the main transmission shaft 7.

By way of example, there follows a description of how the convertible aircraft performs short or vertical landing.

In order to perform a short landing, the first and second tilt fans 1 and 2 are in a vertical position. The main wings A1, A2, A1', A2' lie in the slipstream from the first and second tilt fans 1 and 2. The high-lift flaps VF1, VF2, VF1', VF2' enable the slipstreams from these tilt fans to be deflected downwards, thereby significantly increasing the lift of the main wings A1, A2, A1', A2'. This delays the stalling of the main wings A1, A2, A1', A2'. Under such conditions, the approach speed is made slower, thereby implying that the distance needed for landing is very short.

The convertible aircraft AC, AC' also enables landing to be performed vertically. Under such circumstances, it begins by converting from airplane mode to helicopter mode by progressively tilting the first and second tilt fans 1 and 2. Once these fans 1 and 2 are in the horizontal position, they can act together with the flow of diluted air ejected downwards by the jet deflector 8 to support the aircraft AC, AC'. The aircraft then acts as a helicopter and can land vertically.

The attitude of the convertible aircraft can be trimmed in airplane mode in various ways. A first solution consists in using two "canard" wings and winglets, each winglet being provided with a single flap, a second solution makes use of two "canard" wings together with a tail fin and horizontal tail stabilizers. Which embodiment is selected depends on how the engines are centered, on the payload of the aircraft, and also on the type of aircraft, i.e. whether it is a light aircraft (mass less than about 6 tonnes), or a heavy aircraft (mass greater than about 6 tonnes).

With reference to FIG. 1, the engine installation is situated behind the cabin, so the cabin occupies part of the fuselage only. Balancing the aircraft requires main wings A1', A2' to be used that are sweptback, i.e. directed towards the rear of the aircraft.

The ends of these main wings are provided with respective vertical elements known as winglets W.

These winglets W are commonly used on modern aircraft. They reduce the pressure difference between the upper and lower surfaces at the end of a wing so as to decrease the marginal vortex that is of a turbulent nature. As a result, the winglets W improve the vibration level of the aircraft. In addition, they increase the aspect ratio of the wings, thereby-reducing their drag.

Furthermore, for a light convertible aircraft AC' of the invention, the main wings A1', A2' are located well towards the rear of the fuselage and they are sweptback considerably. Each winglet W can then act as a tail fin, being fitted with a respective a single flap V.

The positioning of the main wings A1', A2' on the fuselage F' is of great importance. Main wings in the high position, i.e. arranged at the top of the fuselage, and main wings in the low position, i.e. arranged at the bottom of the fuselage manifestly do not have the same impact on the operation of the aircraft. In order to pass from airplane mode to helicopter mode, the first and second tilt fans 1, 2 are tilted so as to direct their thrust towards the ground. The length of time during which the main wings A1', A2' are exposed to the tilting slipstreams coming from the first and second tilt fans 1 and 2 must be minimized so as to avoid disturbing the operation of the aircraft.

If the main wings are in the low position, the slipstreams coming from the first and second tilt fans 1 and 2 strike the top surface of the main wings A1', A2'. Consequently, the lift of these main wings A1', A2' is decreased, which can lead to a major safety problem, i.e. loss of control of the aircraft AC'. Under such conditions, only a high position for the main wings A1', A2' can satisfy requirements.

With reference to FIG. 2, in a second embodiment, the convertible aircraft AC is of considerable weight. The engine installation is positioned in the top portion of the fuselage F, above the cabin. This disposition thus enables the cabin to occupy the major fraction of the fuselage F, and thus gives the convertible aircraft AC a large internal load-carrying capacity.

Centering of the convertible aircraft AC then requires swept forward main wings A1, A2 to be used, i.e. main wings extending towards the front of the aircraft. In this embodiment, the use of sweptback main wings would require the "canard" wings to be overdimensioned, which would make them particularly penalizing in terms of weight.

Since the main wings A1, A2 are swept forward, their ends are not towards the rear of the aircraft, but rather towards the middle thereof. Unlike the first embodiment, relating to a light convertible aircraft, winglets cannot act as tail fins since they would be situated too close to the center of gravity of the aircraft AC. A tail fin D is thus arranged at the rear of the fuselage. Advantageously, this tail fin D is also provided with tail stabilizers E, with the tail fin D contributing to control yaw and the stabilizers E to control pitch.

In order to avoid any loss of control of the convertible aircraft AC when converting from airplane mode to helicopter mode, the main wings A1, A2 are disposed on the fuselage F in the high position.

Naturally, implementation of the present invention can be varied in numerous ways. Although two embodiments are described above, it will be understood that it is not conceivable to identify exhaustively all possible embodiments. It is naturally possible to envisage replacing any of the means described by equivalent means, without thereby going beyond the ambit of the present invention.

What is claimed is:

1. A convertible aircraft, comprising:
   first and second tilting ducted rotors on either side of the fuselage forward of the center of gravity of said aircraft; and
   a non-tilting fan that does not propel the aircraft and that cools an exhaust of the aircraft, said non-tilting fan being permanently in a vertical position inside the fuselage.

2. A convertible aircraft according to claim 1, wherein two "canard" wings are on either side of said fuselage.

3. A convertible aircraft according to claim 1, wherein two engines are in said fuselage and drive said non-tilting fan as well as the first and second tilting ducted rotors.

4. A convertible aircraft according to claim 3, wherein said two engines drive said non-tilting fan and the first and second tilting ducted rotors via a single main gearbox.

5. A convertible aircraft according to claim 3, further comprising an intake that provides cold air to said two engine and an exhaust duct that receives hot exhaust gases from said two engines, said non-tilting fan blowing the cold air from said intake directly into said exhaust duct, thereby creating a flow of diluted air in said exhaust duct.

6. A convertible aircraft according to claim 5, further comprising a two-directional jet deflector at the rear of said aircraft that deflects said diluted flow of air when it is expelled from the aircraft.

7. A convertible aircraft according to claim 3, wherein said engines are in the fuselage above the cabin of said convertible aircraft.

8. A convertible aircraft according to claim 7, wherein said convertible aircraft is provided with two main wings disposed on either side of the fuselage, said main wings being sweptforward.

9. A convertible aircraft according to claim 7, including a tail fin.

10. A convertible aircraft according to claim 9, wherein said tail fin is associated with tail stabilizers.

11. A convertible aircraft according to claim 7, wherein two distinct air inlets situated on top of the fuselage feed fresh air to said engines.

12. A convertible aircraft according to claim 8, wherein said main wings are on top of the fuselage.

13. A convertible aircraft according to claim 8, wherein said main wings are provided with double-slotted high-lift flaps.

14. A convertible aircraft according to claim 11, wherein said non-tilting fan sucks in the air coming from said air inlets.

15. A convertible aircraft, comprising:
   first and second tilting ducted rotors disposed on opposite sides of a fuselage of the aircraft forward of a center of gravity of the aircraft;
   two engines in said fuselage that drive a main gear box, said main gear box driving said first and second tilting ducted rotors;
   an intake that provides intake air to said two engines;
   an exhaust duct in said fuselage that receives exhaust from said two engines; and
   a cooling fan means for receiving the intake air from said intake and blowing the intake air directly into said exhaust duct and cooling the exhaust from said two engines, said cooling fan means being in said fuselage and driven by said main gear box.

16. The convertible aircraft of claim 15, wherein said two engines are side-by-side spaced apart from each other in said fuselage, and wherein said cooling fan means is between said two engines.

17. The convertible aircraft of claim 16, wherein said two engines define a passageway therebetween to said exhaust duct for the intake air blown by said cooling fan means.

18. The convertible aircraft of claim 15, wherein said cooling fan means comprises a fan that is not part of a system that propels the aircraft.

* * * * *